United States Patent Office 2,855,404
Patented Oct. 7, 1958

2,855,404

19-OXYGENATED DERIVATIVES OF 17a-OXA-D-HOMO-4-ANDROSTENE-3,17-DIONE

George M. Richards, Skokie, Ill., assignor to G. D. Searle & Co., Chicago, Ill., a corporation of Delaware No Drawing. Application July 12, 1956
Serial No. 597,351

5 Claims. (Cl. 260—343.2)

The present invention relates to 19-oxygenated derivatives of 17a-oxa-D-homo-4-androstene-3,17-dione, and is specifically concerned with compounds of the general structural formula

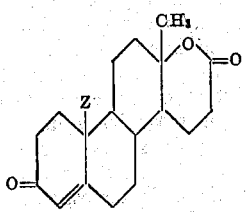

wherein Z can represent a formyl (—CHO) radical, a hydroxymethyl (—CH$_2$OH) radical or an acyloxymethyl (—CH$_2$O-acyl) radical. When Z in the foregoing structural representation is an acyloxymethyl radical, the designated acyl group can be selected from among formyl, acetyl, propionyl, butyryl, valeryl, hexanoyl, heptanoyl, octanoyl, and their branched-chain isomers, the aforementioned acyl groups being the acyl groups of alkanoic acids containing fewer than 9 carbon atoms.

In the manufacture of the compounds of this invention, 17a-oxa-D-homo-4-androstene-3,17-dione (testololactone) is subjected to the action of mammalian adrenal glands. In a specific embodiment, this operation is conducted as a perfusion through bovine adrenal glands as described more fully hereinafter. 19-hydroxy-17a-oxa-D-homo-4-androstene-3,17-dione is isolated by fractionation of the crude transformation product on a silica gel column. Other valuable transformation products, such as 11β-hydroxy-17a-oxa-D-homoandrostane-3,17-dione and 11β-hydroxy-17a-oxa-D-homo-4-androstene-3,17-dione are also obtained in the fractionation procedure.

Upon mild treatment of 19-hydroxy-17a-oxa-D-homo-4-androstene-3,17-dione with esterifying media such as alkanoic acid anhydrides or alkanoic acid chlorides in pyridine solution, esters of this invention are obtained in good yield and in a high state of purity.

The aldehyde, 19-oxo-17a-oxa-D-homo-4-androstene-3,17-dione, is obtained by oxidation of 19-hydroxy-17a-oxa-D-homo-4-androstene-3,17-dione under carefully controlled conditions. For this purpose it is preferred to employ an oxidizing medium comprising chromium trioxide and pyridine, as the use of such reagents as chromium trioxide in acetic acid results chiefly in the formation of degradation products.

The compounds of this invention are valuable pharmacological agents, and display cardiovascular, anti-inflammatory and hormonal properties. They are antihypertensive agents. They are also valuable chemical intermediates by virtue of their employment in processes resulting in the formation of demethylated and aromatized derivatives. Thus, 19-hydroxy-17a-oxa-D-homo-4-androstene-3,17-dione and 19-oxo-17a-oxa-D-homo-4-androstene-3,17-dione can be converted to the known compound, estrololactone, by procedures described hereinafter. Estrololactone can be obtained alternatively by the substitution of 19-hydroxy-17a-oxa-D-homo-4-androstene-3,17-dione or its alkanoic acid esters as starting materials in the degradation procedures described by Ehrenstein, U. S. 2,609,377, whereby the angular hydroxymethyl or acyloxymethyl group is lost with aromatization of the terminal ring to which it is attached. Compositions of this invention are also useful as intermediates in the manufacture of compounds of the 19-nor series. Thus, as described in detail hereinafter, there can be obtained 19-nor-17a-oxa-D-homo-4-androstene-3,17-dione (19-nortestololactone) a useful androgenic and anabolic agent.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

A solution of 1 part of 17a-oxa-D-homo-4-androstene-3,17 - dione (2,4b - dimethyl - 2 - hydroxy - 7 - oxo-1,2,3,4,4a,4b,5,6,7,9,10,10a - dodecahydrophenanthrene-1-propionic acid lacetone, testololactone) in 5000 parts of citrated bovine blood and 5000 parts of citrated calcium-free Tyrode solution containing 50 parts of glucose is perfused 7 times through bovine adrenal glands lacerated at the surface, at a temperature of 36.5 to 37.6° C. in the course of 3 hours. The perfusate is then extracted with isopropyl acetate. The extract is washed with water, dried by azeotropic distillation and concentrated at reduced pressure in a nitrogen atmosphere to a residue of about 50 parts. The residue is diluted with 900 parts of benzene and poured onto a chromatography column containing 100 parts of silica. The column is washed with 500 parts of a 10% and 3000 parts of a 20% solution of ethyl acetate in benzene to remove unreacted testololactone and impurities. Elution with a 25% solution of ethyl acetate in benzene yields first eluates which, on concentration and recrystallization of the residue from ethyl acetate, yield needles melting at about 267–270° C. The ultraviolet absorption spectrum of this product shows little absorption in the region of 240 millimicrons. This compound is 11β-hydroxy-17a-oxa-D-homoandrostane-3,17-dione having the following structural formula

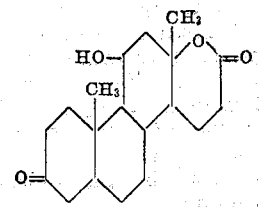

Further elution of the chromatography column with a 25% solution of ethyl acetate in benzene yields the principal product of the adrenal perfusion. This product, obtained by concentration of the eluates and recrystallization, crystallizes from ethyl acetate or from acetone in colorless, thick, dense rhombohedra melting at about 264–267° C. On crystallization from ethanol or mixtures of ethanol and ethyl acetate, the product is obtained in cottony needles. The specific rotation of a 0.9% acetone solution is +41°. The ultraviolet spectrum of a methanolic solution shows an absorption maximum at 240 millicrons with a molecular extinction coefficient of 16,700. Principal infrared absorption maxima in chloroform are observed at about 5.84, 6.03, 6.19, 6.92, 7.82, and 9.09 microns. In a potassium bromide disc, a strong absorption maximum attributable to the hydroxyl group appears at about 2.9 microns. This product gives an intense green fluorescence with concentrated sulfuric acid, becoming apparent only after a contact time of several minutes. This compound is 11β - hydroxy - 17a - oxa - D - homo - 4 - androstene-3,17-dione having the following structural formula

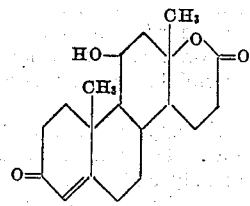

The column is next washed with 33% and 50% solutions of ethyl acetate in benzene. Subsequent elution with a 75% solution of ethyl acetate in benzene and concentration of the eluates yields crystalline residues which consist principally of 19-hydroxy-17a-oxa-D-homo-4-androstene-3,17-dione. Upon crystallization of these residues from ethanol or from a mixture of ethanol and ethyl acetate there is obtained the purified compound in dense, well-formed, white crystals melting at about 248–249° C. No fluorescence is obtained with sulfuric acid. A methanolic solution shows an ultraviolet absorption maximum at 241 millimicrons with a molecular extinction coefficient of 15,700. Infrared absorption maxima in potassium bromide are observed at about 2.93, 5.88, 6.03, 6.19, 6.88, 7.25, 7.40, 7.50, 7.67, 7.78, 7.90, 8.12, 8.30, 8.79, 9.03, 9.28, 9.42, 9.58, 9.82, 10.13, 10.33, 10.62, 11.05, 11.42, and 11.70 microns. The structural formula is

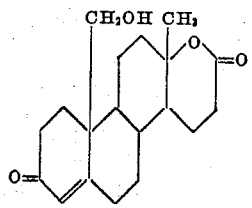

*Example 2*

A solution of 4 parts of 19-hydroxy-17a-oxa-D-homo-4-androstene-3,17-dione, 80 parts of pyridine and 70 parts of acetic anhydride is allowed to stand for 24 hours at about 25° C. The acetic anhydride is decomposed by the addition of water with external cooling, and the mixture is evaporated to dryness. The non-volatile residue is partitioned between 150 parts of water and 1400 parts of ethyl acetate, after which the separated ethyl acetate solution is washed with small portions of water and concentrated to dryness. By crystallization of the residue from a mixture of ethyl acetate and petroleum ether there is obtained 19-acetoxy-17a-oxa-D-homo-4-androstene-3,17-dione which melts at about 138° C. and has the structural formula

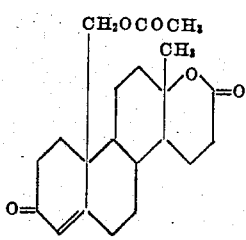

This compound has an ultraviolet absorption maximum at 237 millimicrons with a molecular extinction coefficient of about 16,900.

*Example 3*

By the procedure of Example 2, with the substitution of 30 parts of butyric anhydride for the acetic anhydride, there is obtained 19-butyroxy-17a-oxa-D-homo-4-androstene-3,17-dione.

*Example 4*

An oxidizing medium is prepared by adding a total of 2.5 parts of chromium trioxide, in portions over a period of about 30 minutes, to 25 parts of pyridine, with agitation. External cooling is employed as required to maintain the temperature at about 25° C. To this oxidizing medium there is added a solution of 2 parts of 19 - hydroxy - 17a - oxa - D - homo - 4 - androstene - 3,17-dione in 40 parts of pyridine, and the mixture is allowed to stand at about 25° C. for 4 hours. It is then evaporated to about one-tenth of its original volume, preferably under reduced pressure or with the aid of a stream of nitrogen, in order to avoid excessively long contact with the oxidizing reagent. The residual mixture is diluted with water and extracted with several portions of a mixture of benzene and ether containing approximately equal parts by volume of each solvent component. The organic solvent phase is filtered, washed with small portions of water, and concentrated to dryness, whereupon there is deposited a semi-crystalline residue. By recrystallization from a mixture of ethyl acetate and petroleum ether there is obtained 19-oxo-17a-oxa-D-homo-4-androstene - 3,17 - dione melting at about 230–234° C. Principal infrared maxima in a potassium bromide disc are observed at about 5.85, 5.99, 6.19, 7.48, 7.72, 7.85, 8.20, 9.05, 9.43, 10.12, 11.47, 11.68, and 12.83 microns. There is also observed an infrared absorption maximum attributable to the aldehyde group at about 3.48 microns, said absorption maximum being absent from the infrared absorption spectrum of 19-hydroxy-17a-oxa-D-homo-4-androstene-3,17-dione. The aldehyde has an ultraviolet absorption maximum at about 243 millimicrons and the structural formula

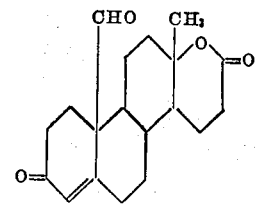

Upon treatment of the crude oxidation product with silica gel, as by chromatography on a silica gel column as described in the following example, there is isolated the aromatized compound, estrololactone.

*Example 5*

A benzene solution of 57 parts of the crude, semi-crystalline oxidation product as obtained in Example 4 is poured onto a chromatography column prepared from 1800 parts of silica. The column is washed with benzene and with mixtures of benzene and ethyl acetate containing gradually increasing proportions of ethyl acetate, whereupon there are obtained eluate fractions which, upon vaporization of the solvent, yield crystalline estrololactone. In a typical case, the colume is first washed with 13,000 parts of benzene, with 9000 parts of a 5 volume percent solution of ethyl acetate in benzene, with 9000 parts of a 10 volume percent solution of ethyl acetate in benzene, and with 4500 parts of a 15 volume percent solution of ethyl acetate in benzene. Upon further elution with a 20 volume percent solution of ethyl acetate in benzene, there is obtained crystalline estrololactone which has the structural formula

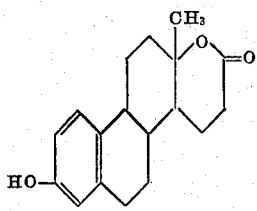

*Example 6*

An anhydrous solution of 4 parts of 19-hydroxy-17a-oxa-D-homo-4-androstene-3,17-dione, 75 parts of cyclohexanone and 400 parts of toluene is treated by the addition of a solution of 1 part of aluminum isopropoxide in 5 parts of toluene, and the mixture is heated under reflux for 48 hours. There is then added a solution of 540 parts of sodium potassium tartrate in 900 parts of water, and the organic solvents are removed by distillation with steam. The remaining aqueous suspension is cooled and extracted with several portions of ethyl acetate, and the combined ethyl acetate solution is washed with water and concentrated to dryness to yield the crude reaction product as a residual oil. This crude product, which amounts to about 3 parts, is dissolved in a mixture of 350 parts of benzene and 130 parts of petroleum ether, and the resulting solution is fractionated on a chromatography column prepared from 200 parts of silica. By elution with benzene and then with mixtures of ethyl acetate in benzene containing gradually increasing proportions of ethyl acetate, there are obtained two principal crystalline products. The first principal crystalline compound to be obtained from the column can be eluted at a convenient rate with a 20 volume percent solution of ethyl acetate in benzene, and is a phenolic material. The second principal crystalline compound can be obtained by elution with a 50 volume percent solution of ethyl acetate in benzene, and is 19-nor-17a-oxa-D-homo-4-androstene-3,17-dione (19-nortestololactone). The purified compound, obtained by recrystallization from ethyl acetate, melts at about 199–201° C. and has an ultraviolet absorption maximum at 238 millimicrons with a molecular extinction coefficient of about 17,200. Principal infrared absorption maxima in a potassium bromide disc are observed at about 5.82, 6.00, 6.18, 7.50, 7.90, 8.25, 9.10, 10.14, and 11.20 microns. The structural formula is

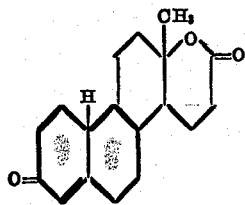

The same compound can be obtained by the fermentation of 19-nortestosterone with suitable Penicillium organisms.

What is claimed is:
1. A compound of the structural formula

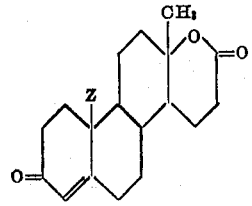

wherein Z is a member of the class consisting of —CHO, —CH$_2$OH, and —CH$_2$O-acyl radicals, the designated acyl group being the acyl group of an alkanoic acid containing fewer than 9 carbon atoms.

2. 19-hydroxy-17a-oxa-D-homo-4-androstene-3,17-dione.

3. 19-oxo-17a-oxa-D-homo-4-androstene-3,17-dione.

4. A compound of the structural formula

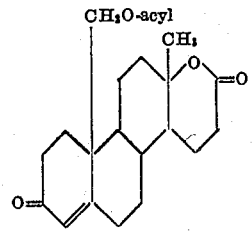

wherein the acyl group is the acyl group of an alkanoic acid containing fewer than 9 carbon atoms.

5. 19-acetoxy-17a-oxa-D-homo-4-androstene-3,17-dione.

References Cited in the file of this patent
UNITED STATES PATENTS
2,508,786    Grant, et al. _____ May 23, 1950

OTHER REFERENCES

Organic Synthesis, Col. vol. II, page 139.
Meyer, A. S.: Experientia, II, 99–102 (1955) (see Chem. Absts., 49, 10407 (1955)).